UNITED STATES PATENT OFFICE.

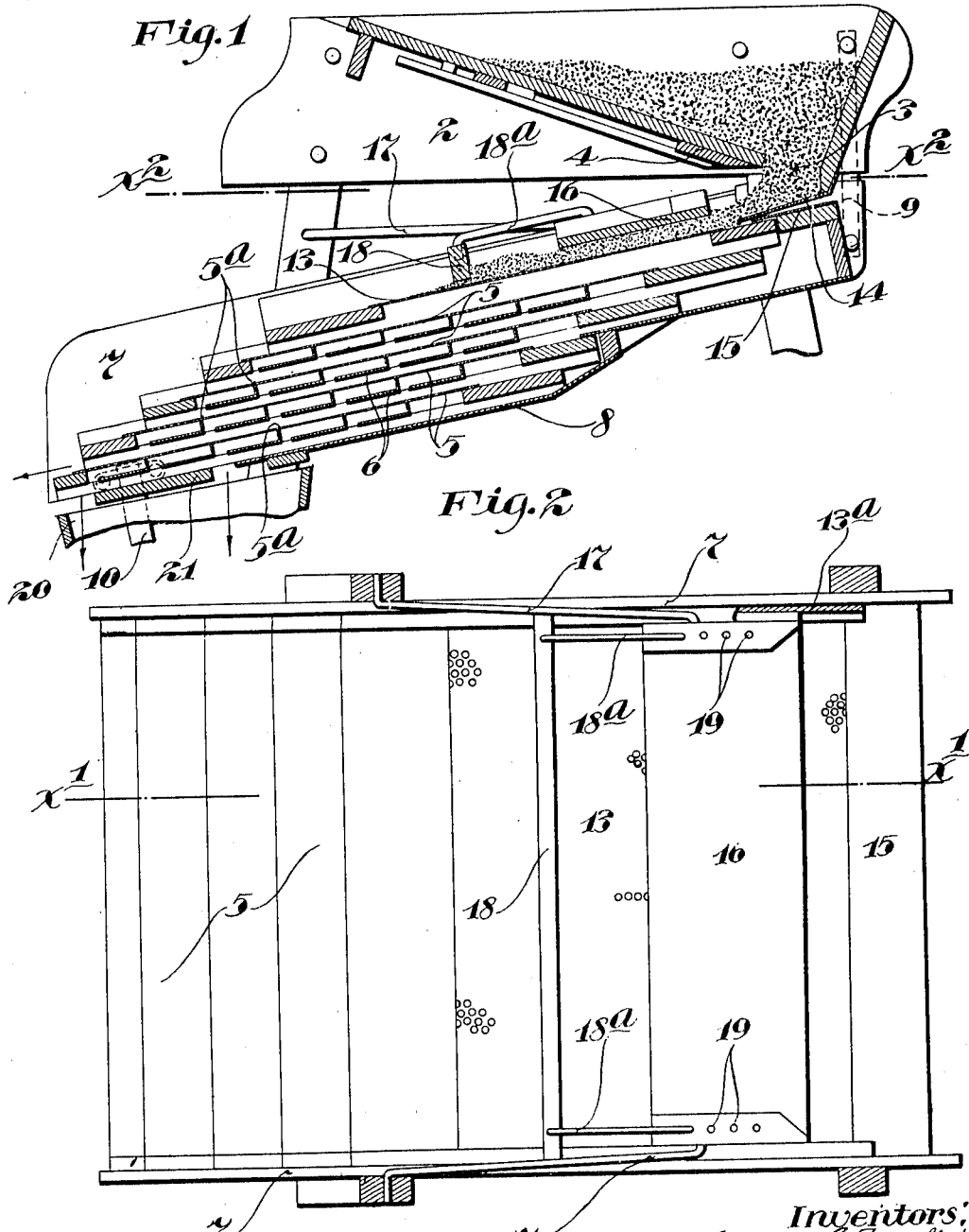
A. S. FROSLID & G. TROSETH.
FEEDING DEVICE FOR GRAIN SEPARATORS.
APPLICATION FILED SEPT. 16, 1912.
1,096,706.
Patented May 12, 1914.

ANTON S. FROSLID AND GUNERIUS TROSETH, OF MINNEAPOLIS, MINNESOTA.

FEEDING DEVICE FOR GRAIN-SEPARATORS.

1,096,706.  Specification of Letters Patent.  Patented May 12, 1914.

Application filed September 16, 1912. Serial No. 720,575.

*To all whom it may concern:*

Be it known that we, ANTON S. FROSLID and GUNERIUS TROSETH, citizens of the United States, residing at Minneapolis, in the county of Hennepin and State of Minnesota, have invented certain new and useful Improvements in Feeding Devices for Grain-Separators; and we do hereby declare the following to be a full, clear, and exact description of the invention, such as will enable others skilled in the art to which it appertains to make and use the same.

Particularly, our invention has for its object to provide an improved grain feeding device for supplying grain to grain separators, both of the hand operated and larger power driven types; and, to such ends, generally stated, the invention consists of the novel devices and combinations of devices, hereinafter described and defined in the claims.

Long experience with grain separators of various types has proven to us that one of the chief reasons why many grain separators fail to properly effect good separation of such grains, for example, as wheat and oats, generally known as "succotash", is due to the unsatisfactory manner in which the grain feeding or supplying means operates to effect the initial distribution of the stock on the separating sieves. This is especially true in grain separators, wherein a gang or bank of superimposed sieves are used to effect the separation of the wheat and oats.

The defect in the above noted initial feeding action, hitherto employed, has been that this initial distribution on the uppermost sieve, herein designated as the distributing screen, has been uncertain and varying, both as to amount of grain delivered and as to the area of sieve surface over which the initial delivery has been made. For instance, the grain or stock upon its first or initial delivery onto this distributing screen, would sometimes collect in deep piles over a relatively small sieve area, and, at other times, upon contact with said screen, would rapidly distribute itself over a very large area thereof, thus rendering it very uncertain just what kind of a start the grain would get on its way through the gang of sieves, but making an uneven and constantly varying distribution a certainty. The subsequent action of the gang of sieves on the stock is very greatly dependent on the kind of initial distribution made on the top sieve of the gang, and the best results can be obtained only when this initial distribution is in the form of a thin evenly distributed sheet, extending transversely completely across the top sieve of the gang, and extending longitudinally of said top sieve such a distance that no good wheat will be carried over with the oats and, yet, all of the good oats will be separated from the good wheat which passes successively through the sieves of the gang. When this is accomplished, if the arrangement of the gang of sieves be adapted for a high grade of separation, such as are, for instance, sieves and interposed aprons or dividers of the general arrangement disclosed in the prior patents to Froslid, numbered 668,175 of date February 19th, 1901, and 684,751 of date October 15th, 1901, then the highest possible grade of separation and the greatest possible capacity or quantity efficiency can be obtained.

An improved grain feeding device or mechanism which will accomplish the above noted desirable results, is illustrated in the accompanying drawings and herein broadly claimed.

The salient features involved in this improved feed device or mechanism may be briefly outlined as follows:—In connection with a suitable feed hopper or stock supplying means, and a vibratory distributing screen or scalper, we provide a so-called banking chamber, arranged to hold and distribute a considerable body of the grain or stock over a predetermined area or zone of said distributing screen. The said distributing screen, in other words, constitutes a perforate bottom to the said banking chamber. In the preferred arrangement, the elements of the banking chamber; or, at least, certain thereof, remain relatively stationary while the head screen vibrates. In this way a predetermined surface area of the stock is held in direct contact with a definite area of the distributing screen, so that, under vibratory movements of the latter, the stock will pass through said screen in a very even and well distributed shower and will thus effect an initial delivery or distribution of a very thin and evenly spread out sheet of grain upon the top sieve of the gang. This improved mechanism also involves other and highly important features, which will be better understood after the same has been more fully described in detail in connection with the accompanying drawings.

In the drawings, like characters indicate like parts throughout the several views.

Referring to the drawings, Figure 1 is a vertical section, taken on the line $x^1\ x^1$ of Fig. 2, through a grain separator to which our improved feed mechanism is applied, some parts being broken away; and Fig. 2 is a horizontal section, taken approximately on the line $x^2\ x^2$ of Fig. 1, some parts being broken away.

The various parts of the machine are supported directly or indirectly on suitable hopper legs, which, at its upper portion, supports a feed hopper 2. This feed hopper 2 has a discharge throat 3 that extends transversely across the bottom thereof and is adapted to be opened to any desired extent, or to be closed by a gate 4 of the usual or any suitable construction.

The improved feed mechanism is adapted for use in connection with separating sieves of various different types and arrangement, but is especially adapted for use in connection with gangs of sieves made up of vertically spaced sieves and interposed dividers and, in the present drawings, it is shown as arranged to effect the initial delivery and distribution of grain to gangs of sieves arranged as disclosed and claimed in the application of Anton S. Froslid, filed of even date herewith, and entitled "grain separators." Briefly described, the said gang comprises vertically spaced sieves 5 and interposed dividers 6, carried by a vibratory shoe 7. The shoe 7 has an imperforate bottom deck 8 and is mounted for vibratory movements on hanger straps 9 and supporting levers 10. The sieves 5 are provided with longitudinally spaced transversely extended imperforate zones 5ª, and each divider 6 has an upper edge portion that underlies an imperforate zone of an overlying sieve, and has a lower edge portion that is arranged to deliver stock onto an imperforate zone of an underlying sieve.

Having reference now to the parts of the improved feed mechanism, the numeral 13 indicates the so-called distributing screen which is carried by the shoe 7 and overlies the top sieve 5 of the gang proper.

The numeral 14 indicates a so-called throat plate that is secured to the back portion of the hopper 2 and underlies the feed throat 3 of said hopper, with its free edge mounted for slight vertical movements, and resting on a bearing plate 15 carried by the head of the sieve shoe 7. The slight vertical movement of the free edge of the said throat plate 14 may be provided for by flexibility in the said plate itself, as shown in the drawings, or by a suitable hinged joint therein.

The numeral 16 indicates a so-called retaining plate which overlies, but is spaced above the upper portion of the distributing screen 13 and, at its ends, is mounted for short sliding movements in channel-shaped runways 13ª, shown as secured on the sides of the frame of said screen. The distributing screen 13 vibrates with the shoe 7, but the retaining plate 16 is anchored to the hopper legs by anchoring links or rods 17.

The numeral 18 indicates a so-called barrier, preferably, in the form of a bar connected to the retaining plate 16 by rods 18ª, and loosely supported on the sides of the frame of said screen 13, with slight clearance between its lower edge and the surface of said screen 13.

It is important that the barrier 18 should be adjusted in respect to the relatively fixed retaining plate 16 and, as shown, provision is made for this adjustment by perforations 19 formed in the ends of said retaining plate 16, and into any of which the downturned inner ends of the rods 18ª are adapted to be inserted. The imperforate bottom deck 8 of the vibratory shoe 7 delivers into a receiving hopper 20, but, in the arrangement shown, the last two of the lower series of dividers 6 deliver onto a deck 21, shown as secured on top of the said hopper 20.

Operation: Obviously, when the throat 3 of the feed hopper 2 is opened, a considerable portion of the stock will run from the said hopper onto the upper portion of the distributing screen 13. The stock from the feed hopper, when the shoe and sieves are at a standstill, will reach its angle of repose when the stock runs onto the head end of the said screen 13, approximately as far as the upper edge of the retaining plate 16. However, when the sieve shoe 7 of the sieves 5 and screen 13, carried thereby, are vibrated, the stock will be fed or caused to flow downward on said screen 13 until the stock fills the space between the said screen and retaining plate 16, and banks up against the barrier 18 approximately, as shown in Fig. 1. The throat plate 14 overlaps the upper end of the frame of the screen 13 and projects between the upwardly extended sides of the frame thereof, thereby preventing leakage of grain at the upper end of the said sieve. Also the said throat plate holds back the stock and prevents the weight of the stock within the feed hopper from being drawn directly onto the distributing screen.

It may now be noted that, in this preferred arrangement, the upwardly projecting sides of the frame of the screen 13 constitute the sides, the barrier 18 constitutes the lower end, and the throat plate 14 and adjacent portions of the hopper 2 constitute the head of the so-called banking chamber, referred to in the introductory part of this specification. The length of this banking chamber in the direction of the travel of the stock may, as already indicated, be varied by adjustments of the barrier 18 in respect to the retaining plate 16. The importance of this adjustment will be later noted. The construction arrangement of the said barrier 18, as well as other parts coöperating to afford the banking chamber, may be varied. For the best results, the retaining plate 16 is held so that it cannot rise or fall in respect to the screen 13, while the barrier 18 is only yieldingly held downward and is spaced slightly above said screen, so as to permit a restricted escape of stock, chiefly oats, under the bottom of the said barrier.

Under vibratory movements of the sieve shoe 7, a slight upward and downward movement will be imparted to the throat plate 14 which insures a continuous even discharge of stock from the hopper 2 and, by agitating the stock slightly in the feed throat 3, it prevents bridging and clogging of the stock in the said feed throat. It will now be seen that, when the machine is in action, a quite deep body of the stock is maintained upon a predetermined definite zone or portion of the so-called scalping screen 13. The retaining plate 16 holds the stock which will be hereinafter treated as succotash, to-wit, wheat and oats, in a quite compact body so that, under vibratory movements of the sieve, there is a tendency to hold the oats flat and, thereby, give the wheat a much better chance to work itself down through the oats and through the distributing screen 13. Hence, the greater part of the wheat will be passed through the screen 13 at the head thereof or at some point beneath the retaining plate 16, while most of the oats will work their way downward and accumulate in the open space between said retaining plate and the barrier 18; and, there being free, will up-end under vibratory movements of the screen, and pass rapidly through said screen. The screen 13 also operates as a scalping screen. Thus, it will be seen that a very good initial separation of the good wheat and good oats is produced by the distributing screen and coöperating elements of the feed mechanism. A small amount of wheat and oats will work under the barrier 18, but the wheat will pass through the tail end of the screen 13 onto the top screen 5 of the gang, while the oats will be tailed over. Thus, not only is the grain delivered onto the top sieve 5 of the gang in a thin evenly distributed sheet, but by far the larger percentage of what will be delivered in the extreme head of said top sieve, while much the larger percentage of oats will be delivered farther down on said top sieve. This lessens the work which must be done by the gang of sieves. The wheat will pass mostly through the head ends or upper perforate zones of the several sieves of the gangs, and onto the bottom deck 8 of the shoe, while the final discharge of the oats off from the lower ends of the several sieves of the gang is accelerated.

The general principles of subdivision and successive separation of the stock, which is performed in the prior patent to Anton S. Froslid, No. 684,751, above identified, are carried out in the present gang of sieves 5 and interposed dividers 6; but the dividers in the gang, herein illustrated, do not have a riding action on the stock.

Adjustments of the barrier 18 longitudinally of the screen 13 will determine the amount of sieve area used to effect the initial feed or distribution of the succotash. When the said barrier is set, this separating area is determined and made definite so that under each vibration of the said screen, an approximately definite and predetermined amount of grain will be passed through the said sieve in an even well distributed shower, as already stated. The adjustment of said barrier 18 should be such that very little of the good wheat will be delivered onto the deck 20, when the said deck is employed, and nearly all of the good wheat free from oats, will pass from the bottom deck 8 into the receiving hopper 10. With this arrangement, a certain amount of oats, containing a small amount of wheat which is delivered onto the deck 20, may be caught by suitable means and re-cleaned or separated.

In a machine of this character, the good wheat delivered into the receiving hopper 20 and containing, usually, some pin oats and other small seeds or foreign material, will be delivered to a long meshed vibratory screen, not shown, and by which the good wheat will be separated from the other material.

It should also be further noted that the screen 13 has a sort of self-cleaning action, due to the fact that it is vibrated under and in contact with a body of stock held in the banking chamber in such a manner that it does not partake of the vibratory movements of the said screen.

What we claim is:—

1. The combination with an inclined vibratory screen, of a supply hopper having an opening in its bottom and provided with a throat plate underlying its discharge opening and delivering directly onto the upper end of said screen, and elements affording a banking chamber that overlies said screen, extends downward on said screen from said throat plate and holds a body of stock on a predetermined definite area of said screen.

2. The combination with an inclined vibratory screen, of elements affording a banking chamber overlying said screen and constructed to hold a body of stock in contact with a predetermined definite area of said screen, said banking chamber at its lower side having a barrier slightly raised above said screen and permitting a restricted escape of the stock from the said banking chamber.

3. The combination with an inclined vibratory screen, of elements affording a banking chamber overlying said screen and constructed to hold a body of stock in contact with a predetermined definite area of said screen, the said banking chamber having a lower end member that is adjustable longitudinally of said screen, to vary the length of said banking chamber.

4. The combination with an inclined vibratory screen, of elements affording a banking chamber overlying said screen and constructed to hold a body of stock in contact with a predetermined definite area of said screen, said banking chamber at its lower side having a barrier slightly raised above said screen and permitting a restricted escape of the stock from the said banking chamber, the said barrier being adjustable longitudinally of said screen to vary the length of said banking chamber.

5. The combination with an inclined vibratory screen, of elements affording a banking chamber overlying said screen and constructed to hold a body of stock in contact with a predetermined definite area of said screen, said banking chamber at its lower side having a barrier slightly raised above said screen and permitting a restricted escape of the stock from the said banking chamber, and a feed hopper having a feed throat delivering into the upper end of said banking chamber.

6. The combination with an inclined vibratory screen, of elements affording a banking chamber overlying said screen and constructed to hold a body of stock in contact with a predetermined definite area of said screen, said banking chamber at its lower side having a barrier slightly raised above said screen and permitting a restricted escape of the stock from the said banking chamber, and a feed hopper having a feed throat and an underlying throat plate which throat plate underlies said feed throat and overlies the head end of said screen.

7. The combination with an inclined vibratory screen, of elements affording a banking chamber overlying said screen and arranged to hold a body of stock in contact with a predetermined area of said screen, said banking chamber having at its lower end an anchored barrier that is yieldingly held downward, and a feed hopper delivering into said banking chamber.

8. The combination with an inclined vibratory screen, of elements affording a banking chamber overlying said screen and arranged to hold a body of stock in contact with a predetermined definite area of said screen, and a retaining plate located within said banking chamber and overlying and spaced vertically from said screen, and means for supplying grain to the head end of said banking chamber.

9. The combination with an inclined vibratory screen, of elements affording a banking chamber overlying said screen and arranged to hold a body of stock in contact with a predetermined definite area of said screen, said banking chamber at its lower end having an anchored barrier slightly spaced above said screen, an anchored retaining plate in said banking chamber spaced above said screen, and means for supplying stock to the head end of said banking chamber.

In testimony whereof we affix our signatures in presence of two witnesses.

ANTON S. FROSLID.
GUNERIUS TROSETH.

Witnesses:
F. D. MERCHANT,
HARRY D. KILGORE.

Copies of this patent may be obtained for five cents each, by addressing the "Commissioner of Patents, Washington, D. C."